(12) United States Patent
Jacobs

(10) Patent No.: US 7,479,090 B2
(45) Date of Patent: Jan. 20, 2009

(54) METHOD AND APPARATUS FOR CONTROLLING A CONTINUOUSLY VARIABLE TRANSMISSION

(75) Inventor: Craig S. Jacobs, Canton, MI (US)

(73) Assignee: Eaton Corporation, Cleveland, OH (US)

( * ) Notice: Subject to any disclaimer, the term of this patent is extended or adjusted under 35 U.S.C. 154(b) by 382 days.

(21) Appl. No.: 11/481,478

(22) Filed: Jul. 6, 2006

(65) Prior Publication Data
US 2008/0009389 A1   Jan. 10, 2008

(51) Int. Cl.
*F16H 61/662* (2006.01)
*G06F 19/00* (2006.01)

(52) U.S. Cl. .............................. 477/43; 477/37; 701/61; 701/65

(58) Field of Classification Search .................... 701/60, 701/61, 65; 477/37, 43
See application file for complete search history.

(56) References Cited

U.S. PATENT DOCUMENTS

| | | | |
|---|---|---|---|
| 4,458,560 A | 7/1984 | Frank et al. | |
| 4,580,465 A | 4/1986 | Omitsu | |
| 4,598,611 A | 7/1986 | Frank | |
| 4,622,865 A | 11/1986 | Itoh et al. | |
| 4,656,587 A | 4/1987 | Osanai et al. | |
| 4,700,590 A | 10/1987 | Omitsu | |
| 4,753,133 A | 6/1988 | Itoh et al. | |
| 4,989,149 A | 1/1991 | Mimura et al. | |
| 5,558,596 A | 9/1996 | Adachi et al. | |
| 6,033,338 A | 3/2000 | Jackson et al. | |
| 6,063,004 A | 5/2000 | Ibamoto et al. | |
| 6,293,888 B1 | 9/2001 | Moon | |
| 6,370,462 B1 | 4/2002 | Speicher et al. | |
| 6,524,216 B2 | 2/2003 | Suzuki et al. | |
| 6,709,355 B2 | 3/2004 | O'Hora | |
| 6,811,515 B2 | 11/2004 | Ibamoto et al. | |
| 6,847,189 B2 * | 1/2005 | Frank | 320/104 |
| 6,908,412 B2 * | 6/2005 | Kurabayashi | 477/44 |
| 7,261,672 B2 * | 8/2007 | Frank et al. | 477/45 |
| 7,285,869 B2 * | 10/2007 | Syed et al. | 290/40 C |

* cited by examiner

*Primary Examiner*—Ha D. Ho
(74) *Attorney, Agent, or Firm*—Brooks Kushman P.C.

(57) ABSTRACT

A method of controlling the ratio of a continuously variable transmission (CVT) that is controlled by a CVT controller is provided. The method includes determining the torque produced by an engine, calculating an acceleration limit value based upon the torque value and the engine inertia value and a calibrated acceleration limiting ratio. The acceleration limit value is compared to the desired engine speed value to determine a command engine speed value. The CVT ratio is then calculated by dividing the command engine speed value by a measured vehicle speed value. The calculated CVT ratio is compared to a measured CVT ratio and a control signal is sent to an actuator of a CVT. Torque provided to the engine to overcome the engine inertia is limited by the method so that the step change in torque provided to the vehicle wheels, as the engine approaches the command engine speed value, is reduced.

21 Claims, 2 Drawing Sheets

METHOD AND APPARATUS FOR CONTROLLING A CONTINUOUSLY VARIABLE TRANSMISSION

BACKGROUND OF THE INVENTION

1. Field of the Invention

The present invention relates to a method and apparatus for controlling a continuously variable transmission during vehicle launch at low speeds to allow acceleration to a desired vehicle speed while providing a smooth ride.

2. Background Art

A continuously variable transmission (CVT) may be used to transfer torque from an engine to a vehicle's wheels. A CVT may comprise a drive sheave wheel and a driven sheave wheel that engage a drive belt or chain and are dynamically adjusted. The effective diameter of the drive sheave wheel and the driven sheave wheel may be varied according to a desired CVT ratio. The CVT ratio is the ratio of the drive sheave wheel effective diameter to the driven sheave wheel effective diameter. Rotation of the drive wheel is transferred to the driven wheel by the CVT belt or chain.

One of the benefits of a CVT is that the CVT may be controlled by a CVT controller to permit the engine to be operated to optimize fuel efficiency. The CVT permits the vehicle speed to vary even though the engine speed is held constant by simply changing the CVT ratio. The engine speed is not required to be constant. Generally, engine speed may be varied independently of the vehicle road speed.

When a vehicle is launched from a low speed or standing stop, the engine must accelerate from idle to the desired operating speed of the engine. The engine must overcome engine inertia as the engine accelerates. Part of the torque from the engine is used by the engine to overcome engine inertia. For example, as much as fifty percent of engine torque can be used at low speed conditions to accelerate the engine and overcome the engine's inertia. As a result, less torque is provided to the wheels of the vehicle during low speed operations as the engine is accelerated for the purpose of overcoming the engine's own inertia.

An undesirable lurching motion may occur when acceleration of the engine to the desired vehicle speed is completed. When the engine reaches its desired speed, there is no need to further accelerate the engine and the engine inertia load is reduced essentially to zero. All of the torque from the engine is then directed to the wheels of the vehicle. When torque to the wheels spikes, it causes the vehicle to lurch to such an extent it may be felt by a driver or passenger.

Another important characteristic when evaluating vehicle performance is vehicle acceleration from launch. It is generally desirable to accelerate from launch at maximum engine acceleration so that the engine may quickly run at its optimum speed/power. It is generally considered to be undesirable to reduce the acceleration of the engine because such a reduction in turn reduces acceleration of the vehicle.

The desired engine speed is ramped from the engine launch speed to the engine target speed generally at maximum acceleration. This may cause the CVT to begin variating before the target speed is reached. During engine acceleration, for example, 50% of the engine's torque may be used to overcome inertia, while 50% of the engine's torque may be provided to the vehicle wheels. When the engine inertia is overcome as the vehicle reaches its operating speed, the engine transitions to providing 90-95% of the engine's torque to the vehicle wheels.

The present invention is directed to solving the above problems and other problems according to the method and system as summarized below.

SUMMARY OF THE INVENTION

According to one aspect of the present invention, a method is provided for controlling the ratio of a continuously variable transmission that is controlled by a CVT controller. The method comprises determining the torque produced by an engine to develop a torque value. An acceleration limit value is calculated by dividing the torque value by an engine inertia value and multiplying by a limiting ratio. The acceleration limit value is then compared to a desired engine speed value to determine a command engine speed value. The CVT ratio is calculated by dividing the command engine speed value by a measured speed value. The CVT ratio is compared to a measured CVT ratio and a control signal is sent to an actuator of the CVT, whereby torque provided to the engine to overcome the engine's inertia is limited so that the step change in torque provided to the wheels of a vehicle as the engine approaches the command engine speed is reduced.

According to another aspect of the present invention, a system is provided for controlling a continuously variable transmission (CVT). An engine produces torque that is quantified as a torque value. A CVT controller calculates an acceleration limit value by dividing the torque value by an engine inertia value and multiplying by a limiting ratio. The CVT controller compares the acceleration limit value to a desired engine speed value to determine a command engine speed value. The CVT controller calculates a CVT ratio by dividing the command engine speed value by a measured vehicle speed value. The CVT controller compares the CVT ratio to a measured CVT ratio and sends a control signal to an actuator of the CVT. The torque provided to the engine to overcome the engine's inertia is limited to reduce the step change in torque provided to a plurality of wheels of a vehicle as the engine approaches a command engine speed.

According to other aspects of the present invention, the step of determining the torque may be performed by monitoring the engine torque value as obtained from a data link monitoring engine performance. The engine inertia value may be a constant that is programmed into the CVT controller.

According to other aspects of the present invention, the limiting ratio may be programmed into the CVT controller as a constant value. The constant engine inertia value programmed for the limiting ratio may be between 5 and 10%. Alternatively, other constant values may be programmed for the limiting value depending upon trade-off between the time required for vehicle acceleration against the desired smooth ride performance characteristics.

As a further alternative, the limiting ratio may be programmed into the CVT controller in the form of a look-up table that can provide a different limiting value depending upon an input from an additional input signal. Examples of such an additional input signals may be a signal source such as a throttle position switch, a mode switch, or a grade switch. The throttle position switch may provide an indication as to the driver's desired level of acceleration. A mode switch may be used to override or engage the limiting ratio that is used to determine the command engine speed value. A grade switch may be used to indicate the grade of the road over which the vehicle must traverse and may make available a different ratio depending upon the torque required to traverse the grade.

The desired engine speed value may a programmed value that corresponds to the desired engine speed. The step of comparing the acceleration limit value to a desired engine speed value for determining a command engine speed value may be performed in a rate limiter circuit element that has a reset mechanism that is actuated at vehicle launch. The step of comparing the CVT ratio to a measured CVT ratio may be performed iteratively in a feedback control circuit that compares the CVT ratio output of the CVT ratio generator to the measured CVT ratio of the CVT. The measured CVT ratio is obtained from the CVT controller and is provided to a feedback control circuit. The measured CVT ratio may be obtained from a sensor or a control output of the CVT.

These and other aspects of the present invention will be better understood in view of the attached drawings and following detailed description of the invention.

DETAILED DESCRIPTION OF THE PREFERRED EMBODIMENT(S)

Figure 1:
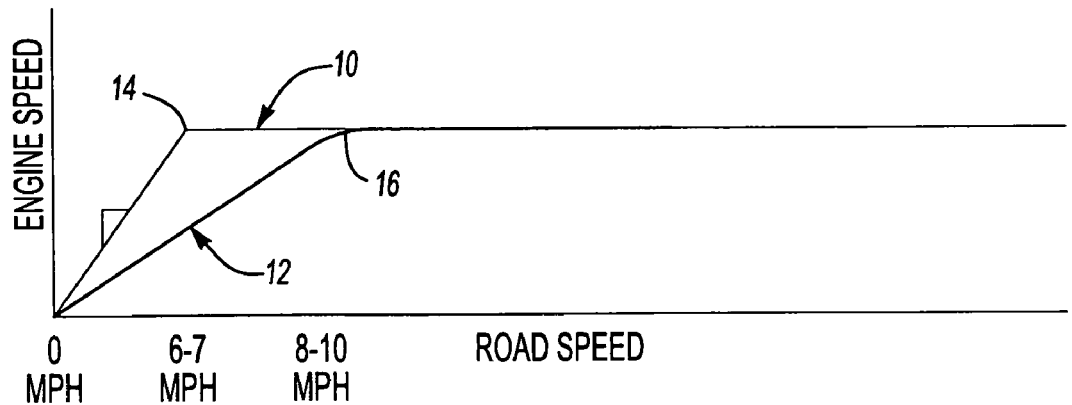
FIG. 1 is a diagrammatic graph of a vehicle's road speed compared to engine speed comparing the performance of one example of a prior art system to the system of the present invention.

Referring to FIG. 1, a graph is provided that compares a normal acceleration from launch curve 10 to a rate limited acceleration from launch curve 12. A normal transition point 14 represents the transition in engine speed as it accelerates from launch to the running rpm, or constant rpm, level. For example, as an engine accelerates from launch or zero engine speed to 1,400 rpm, the engine accelerates at a relatively rapid rate to overcome engine inertia. At the normal transition point 14, the vehicle may undesirably lurch forward due to a step change in torque that will be described with reference to FIG. 2. The rate limited acceleration from launch curve 12 has a rate limited transition period 16 that provides a more gradual transition from engine acceleration to the constant engine speed. Engine acceleration is lower during the launch curve 12 resulting in the engine providing less torque change in transition. Acceleration is more gradual with the rate limited acceleration curve and the rate limited transition period 16 is more gradual than the normal transition point 14. The normal acceleration curve results in the engine reaching its constant running rpm value more rapidly, for example, at about the time the vehicle is traveling between 6 and 7 miles per hour. In contrast, the rate limited acceleration curve 12 is more gradual and results in the vehicle reaching the running rpm constant value, for example, by the time the vehicle is traveling at 8 to 10 miles per hour.

Figure 2:
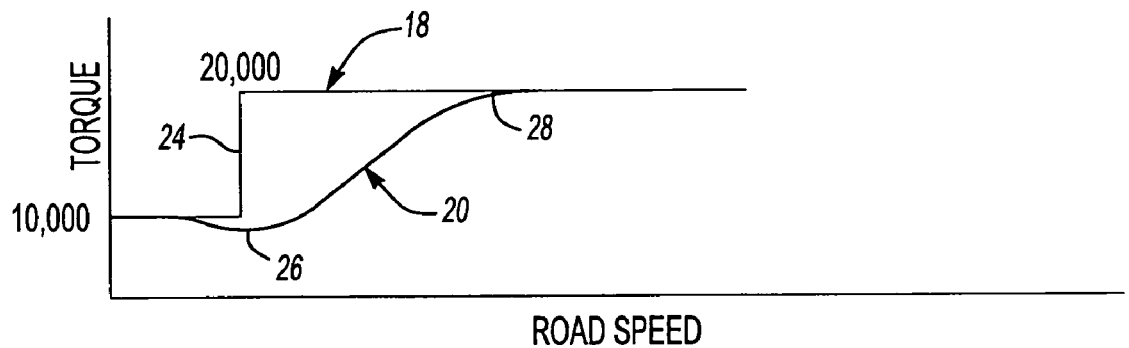
FIG. 2 is a diagrammatic graph of a vehicle's road speed to torque for one example comparing the prior art torque curve to a torque curve of the system made in accordance with the present invention.

Referring to FIG. 2, a normal torque curve from launch 18 is shown in comparison to a rate limited torque curve from launch 20. In the normal torque curve 18, the torque provided by the engine to the vehicle wheels is initially reduced because of the need to overcome engine inertia until the engine reaches its target speed. For example, an engine may initially provide 10,000 foot pounds of torque to the vehicle wheels as the engine is overcoming engine inertia. If half of the engine torque is required to overcome engine inertia, the torque during acceleration from launch may initially be 10,000 foot pounds of torque. When the engine reaches its desired speed, a step change in torque 24 occurs when the full torque of the engine is available to be provided to the vehicle wheels. For example, if 20,000 foot pounds of torque is available when the engine is running at its constant running rpm, substantially all of the torque is provided to the vehicle wheels. In contrast, the rate limited torque curve 20 indicates that engine torque is reduced at an initial transition change in torque 26 that is caused by reducing the CVT ratio, as will be described with reference to FIG. 3 below. After the initial transition change in torque 26, the amount of torque provided to the vehicle wheels gradually increases until it reaches a final transition change in torque 28 wherein the torque increases at a reduced rate until the final torque is reached. This slower acceleration results in a gradual increase in torque provided to the vehicle wheels until the running engine speed is obtained.

Figure 3:
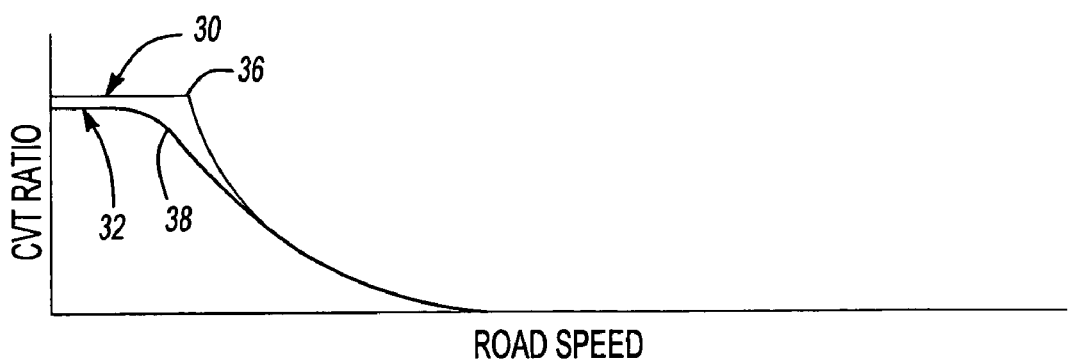
FIG. 3 is a diagrammatic graph of a vehicle's road speed to CVT ratio comparing one example of a prior art system to the system of the present invention.

Referring to FIG. 3, a normal CVT ratio curve 30 is compared to a rate limited CVT ratio curve 32. A step change in the CVT ratio 36 is shown wherein the CVT ratio is rapidly reduced when the step change in torque 24, shown in FIG. 2, is reached. The CVT ratio is initially rapidly reduced, but then is reduced more gradually as the desired CVT ratio is obtained. In contrast, the rate limited CVT ratio curve 32 gradually reduces the CVT ratio at the transition change in CVT ratio shown at 38 and then more gradually approaches the desired CVT ratio.

Figure 4:
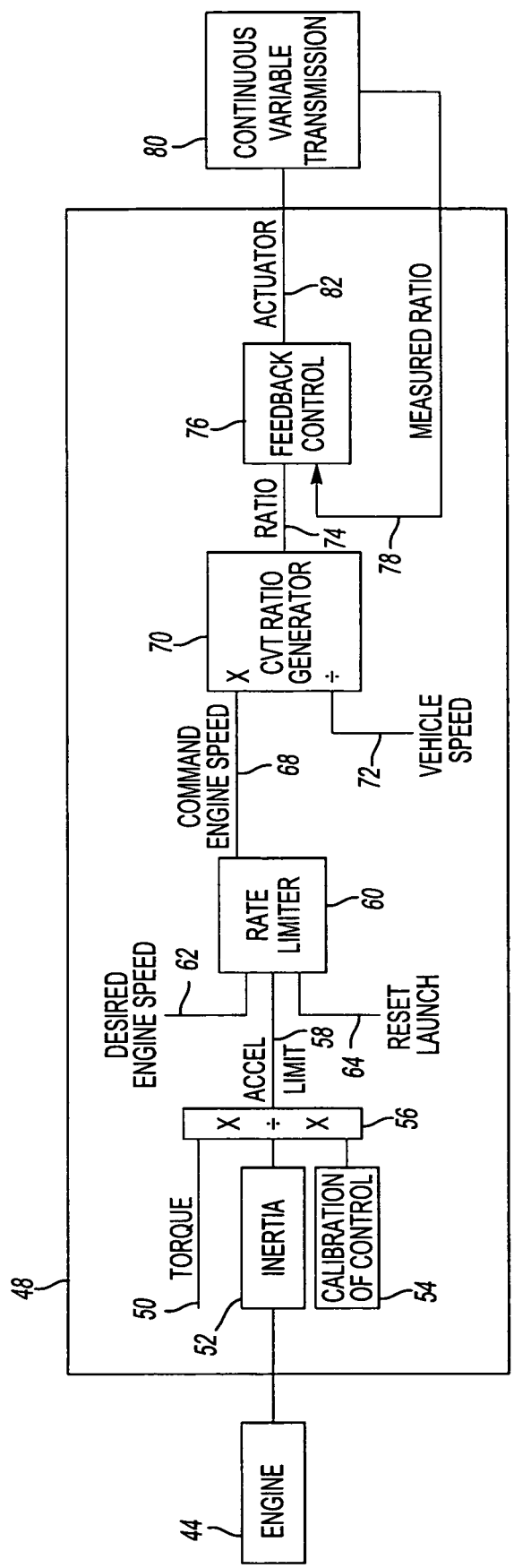
FIG. 4 is a flowchart illustrating one embodiment of the present invention.

Referring to FIG. 4, a rate limiting system 40 is shown that includes an engine 44 and a CVT controller 48. The engine 44 provides torque to the system 40. A torque value 50 may be obtained from a torque sensor or from a data link, such as a J1939 data link. The torque data input 50, engine inertia value 52 and rate limit calibration 54 are provided to an acceleration limit comparator 56. The torque value 50 is divided by the engine inertia value 52 and multiplied by the CVT rate limit calibration 54 in the acceleration limit comparator 56. For example, if engine torque of 20,000 foot pounds is input and a constant value of engine inertia of 50% is applied with a rate limit calibration of between 5% and 10%, the acceleration limit comparator 56 provides an acceleration limit at 58 that limits the acceleration of the engine during the period of acceleration from launch.

The acceleration limit value 58 is provided to a rate limiter 60. The rate limiter 60 also is provided with an engine speed value input 62 that corresponds to the desired engine speed when the engine is running at its constant speed. A reset is provided at 64 for the rate limiter that resets the rate limiter when the engine speed drops to idle or below a predetermined value.

The rate limiter 60 provides a command engine speed value at 68 to a CVT ratio generator 70. The CVT ratio generator 70 also receives an input corresponding to the actual vehicle speed so that the command engine speed 68 is divided by the vehicle speed 72 to develop a CVT ratio value at 74.

The CVT ratio value 74 is provided to a feedback control 76. The feedback control 76 receives an input corresponding to the measured CVT ratio at 78 from the continuously variable transmission 80. The CVT ratio value 74 and measured CVT ratio 78 are compared by the feedback control that provides an input to an actuator at 82 for the continuously variable transmission 80.

While an embodiment of the invention has been illustrated and described, it is not intended that this embodiment illustrates and describes all possible forms of the invention. The words used in the specification are words of description rather than limitation, and it is understood that various changes may be made without departing from the spirit and scope of the invention.

What is claimed is:

1. A method of controlling the ratio of a continuously variable transmission (CVT) that is controlled by a CVT controller, comprising:
   determining the torque produced by an engine to develop a torque value;
   calculating an acceleration limit value by dividing the torque value by an engine inertia value and multiplying by a limiting ratio;
   comparing the acceleration limit value to a desired engine speed value to determine a command engine speed value;
   calculating the CVT ratio by dividing the command engine speed value by a measured vehicle speed value;
   comparing the CVT ratio to a measured CVT ratio; and
   sending a control signal to an actuator of the CVT, whereby torque provided to the engine to overcome the engine's inertia value is limited so that a step change in torque provided to a plurality of wheels of a vehicle as the engine approaches the command engine speed value is reduced.

2. The method of claim 1 wherein the step of determining the torque is performed by monitoring the engine torque value that is obtained from a datalink that monitors engine performance.

3. The method of claim 1 wherein the engine inertia value is a constant that is programmed into the CVT controller.

4. The method of claim 1 wherein the limiting ratio is programmed into the CVT controller as a constant value.

5. The method of claim 3 wherein the constant engine inertia value programmed for the limiting ratio is between 5 and 10%.

6. The method of claim 1 wherein the limiting ratio programmed into the CVT controller is obtained from a look-up table with reference to an additional input signal.

7. The method of claim 6 wherein the additional input signal is obtained from a signal source selected from the group consisting of:
   a throttle position switch that indicates the relative position of the throttle;
   a mode switch that is controlled by an operator to select a mode of operation of the CVT controller; or
   a grade switch that indicates the grade angle of a road on which the vehicle is traveling.

8. The method of claim 1 wherein the desired engine speed value is a programmed value corresponding to the desired engine speed.

9. The method of claim 1 wherein the step of comparing the acceleration limit value to the desired engine speed value to determine the command engine speed value is performed in a rate limiter circuit element that has a reset mechanism that is activated at vehicle launch.

10. The method of claim 1 wherein the step of comparing the CVT ratio to the measured CVT ratio is performed iteratively in a feedback control circuit that compares a CVT ratio output of the CVT ratio generator to a measured CVT ratio of the CVT.

11. The method of claim 1 wherein the measured CVT ratio is obtained from the CVT controller and is provided to a feedback control circuit.

12. A system for controlling a continuously variable transmission (CVT), comprising:
   an engine that produces torque that is determined to be a torque value;
   a CVT controller that calculates an acceleration limit value by dividing the torque value by an engine inertia value and multiplying by a limiting ratio, the CVT controller compares the acceleration limit value to a desired engine speed value to determine a command engine speed value, the CVT controller calculates a CVT ratio by dividing the command engine speed value by a measured vehicle speed value, the CVT controller compares the CVT ratio to a measured CVT ratio and sends a control signal to an actuator of the CVT, whereby the torque provided to the engine to overcome the engine's inertia value is limited to reduce the step change in torque provided to a plurality of wheels of a vehicle as the engine approaches a command engine speed value.

13. The system of claim 12 wherein the determined torque is performed by monitoring the engine torque value that is obtained from a datalink that monitors engine performance.

14. The system of claim 12 wherein the engine inertia value is a constant that is programmed into the CVT controller.

15. The system of claim 12 wherein the limiting ratio is programmed into the CVT controller as a constant value.

16. The system of claim 12 wherein the limiting ratio programmed into the CVT controller is obtained from a look-up table with reference to an additional input signal.

17. The system of claim 16 wherein the additional input signal is obtained from a signal source selected from the group consisting of:
   a throttle position switch that indicates the relative position of the throttle;
   a mode switch that is controlled by an operator to select a mode of operation of the CVT controller; or
   a grade switch that indicates the grade angle of a road on which the vehicle is traveling.

18. The system of claim 12 wherein the desired engine speed value is a programmed value corresponding to the desired engine speed.

19. The system of claim 12 wherein the comparing the acceleration limit value to the desired engine speed value to determine the command engine speed value is performed in a rate limiter circuit element that has a reset mechanism that is activated at vehicle launch.

20. The system of claim 12 wherein the comparing the CVT ratio to the measured CVT ratio is performed iteratively in a feedback control circuit that compares a CVT ratio output of the CVT ratio generator to a measured CVT ratio of the CVT.

21. The system of claim 12 wherein the measured CVT ratio is obtained from the CVT controller and is provided to a feedback control circuit.

* * * * *

UNITED STATES PATENT AND TRADEMARK OFFICE
CERTIFICATE OF CORRECTION

PATENT NO. : 7,479,090 B2 Page 1 of 1
APPLICATION NO. : 11/481478
DATED : January 20, 2009
INVENTOR(S) : Craig S. Jacobs It is certified that error appears in the above-identified patent and that said Letters Patent is hereby corrected as shown below:

Column 5, Line 59, Claim 10:

Delete "output of the CVT" and insert -- output of a CVT --.

Column 5, Line 59, Claim 10:

Delete "a measured" and insert -- the measured --.

Column 6, Line 11, Claim 12:

Delete "the step" and insert -- a step --.

Signed and Sealed this

Twenty-fourth Day of March, 2009

JOHN DOLL
*Acting Director of the United States Patent and Trademark Office*